C. S. MARTIN.
Carriage-Spring.
No. 56,073. Patented July 3, 1866.
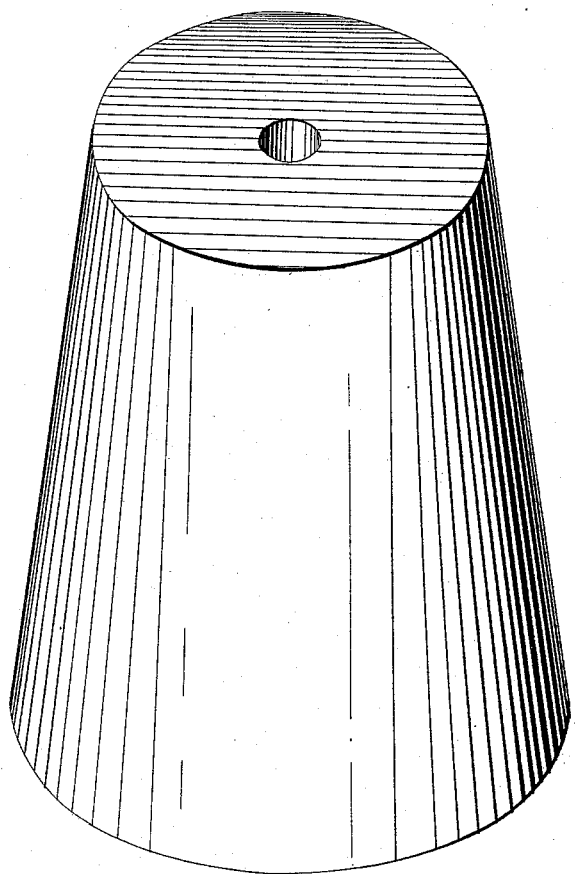
Witnesses.
R. Mason
L. A. Murphy
Inventor
Charles S. Martin

UNITED STATES PATENT OFFICE.

CHARLES S. MARTIN, OF MILWAUKEE, WISCONSIN.

IMPROVEMENT IN WAGON-SPRINGS.

Specification forming part of Letters Patent No. 56,073, dated July 3, 1866.

*To all whom it may concern:*

Be it known that I, CHARLES S. MARTIN, of Milwaukee, in the county of Milwaukee, in the State of Wisconsin, have invented a new and useful Improvement in India - Rubber Springs for Wagons; and I do hereby declare that the following is a full, clear, and exact description thereof, reference being had to the annexed drawing, made part of this specification.

The drawing represents one of my improved springs in perspective.

My improvement consists in making an india-rubber spring for wagons in the form of the frustum of a cone or pyramid.

I found upon trial that cylindrical rubber springs or other forms of blocks of rubber of equal thickness would not give sufficient elasticity in cases where the wagon was lightly loaded if the spring was heavy enough to sustain a heavy load.

To obviate that difficulty I make the springs in the form of the frustum of a cone or pyramid, by which I am able to secure, first, the broad flat base upon which to rest the spring, and, secondly, by the tapering form, the elasticity of the spring for light loads, which operate upon the slender apex, while the increase of the load, by compressing the rubber, widens the top and causes the spring to assume a cylindrical form, thus securing and retaining its elasticity with the heaviest load which the spring is intended to sustain.

This spring is equally applicable to all purposes for which such springs are used when they are intended to sustain varying loads.

What I claim as my invention, and seek to secure by Letters Patent, is—

Constructing the springs of vehicles of solid blocks of india-rubber in the form of the frustum of a cone or pyramid, or having only an opening sufficient for the passage of a bolt through them, substantially as set forth.

In testimony whereof I have signed my name to this specification in the presence of two subscribing witnesses.

CHARLES S. MARTIN.

Witnesses:
JOHN S. HOLLINGSHEAD,
JOHN D. BLOOR.